United States Patent [19]

Satoh et al.

[11] Patent Number: 4,720,055
[45] Date of Patent: Jan. 19, 1988

[54] TAPE CLAMP MECHANISM FOR REEL HUB OF TAPE CASSETTE

[75] Inventors: Takateru Satoh; Haruo Shiba, both of Nagano, Japan

[73] Assignee: TDK Corporation, Japan

[21] Appl. No.: 795,639

[22] Filed: Nov. 6, 1985

[30] Foreign Application Priority Data

Nov. 7, 1984 [JP] Japan ............................ 59-169085[U]

[51] Int. Cl.$^4$ ............................................. B65H 75/28
[52] U.S. Cl. .................................................... 242/74.1
[58] Field of Search .................... 242/74, 74.1, 74.2

[56] References Cited

U.S. PATENT DOCUMENTS

| | | | |
|---|---|---|---|
| 3,661,345 | 5/1972 | Ritz, Jr. et al. | 242/74.1 X |
| 4,181,272 | 1/1980 | Shiba et al. | 242/74.1 |
| 4,290,562 | 9/1981 | Sasaki et al. | 242/74 |
| 4,341,358 | 7/1982 | Shoji | 242/74.1 |
| 4,436,253 | 3/1984 | Watanabe | 242/74.1 |

Primary Examiner—Stuart S. Levy
Assistant Examiner—Joseph J. Hail, III
Attorney, Agent, or Firm—Steinberg & Raskin

[57] ABSTRACT

A tape clamp mechanism for the reel hub of a tape cassette has a clamp block for clamping a tape to the reel hub. The clamp block has a main block having spaced opposite ends, an outer curved surface and an inner surface corresponding to the outer circumferential curved surface of the reel hub. A first pair of prongs project from the inner surfaces of both ends of the clamp block. A bridge member is provided on the inner surface of the main block. A second pair of prongs projects from the bridge member. The reel hub has a recess for receiving the clamp block. The recess has cavities for interacting with the first and second pairs of prongs of the clamp block. The clamp block is settable in the recess of the reel hub by a snap mounting or friction fit mounting method.

14 Claims, 5 Drawing Figures

TAPE CLAMP MECHANISM FOR REEL HUB OF TAPE CASSETTE

BACKGROUND OF THE INVENTION

The present invention relates to tape clamp mechanism for the reel hub of a tape cassette tape. The tape cassette is of a type used for video cassette recorders and audio systems.

Generally, in a tape cassette, the magnetic tape is wound around both the supply reel and the take-up reel with the magnetic surface facing outside. This type of tape is subject to a considerable amount of tensile load when the tape stops running in the fast forward or rewind mode of operation in the tape cassette. Thus, in order to enable the tape to withstand such load, leader tapes for increasing the strength of the tape are provided at both ends of the cassette tape. The utilization of the leader tapes also increases the clamping strength of the leader tapes, so that the tape will not easily come off the clamp unit.

SUMMARY OF THE INVENTION

The principal object of the invention is to provide a tape clamp mechanism for the reel hub of a tape cassette, which mechanism enables the outer surface of the clamp block to be free of the effect of deformation occurring at the time of clamping.

An object of the invention is to provide a tape clamp mechanism for the reel hub of a tape cassette with greater clamping force for the tape.

Another object of the invention is to provide a tape clamp mechanism for the reel hub of a tape cassette, which mechanism permits the clamp block to be set in the recess of the reel hub with less pressure.

The clamp block of the invention has male prongs designed to enable the clamp block to be mounted by either the snap mounting method, or the frictional fit mounting method, and a reel hub provided with a complementary set of interior female notches, or cavities, for interaction with the prongs.

More particularly, in accordance with the invention, a tape clamp mechanism for clamping the tape to the reel hub of the tape cassette comprises a main block having an outer curved surface corresponding to the outer circumferential curved surface of the reel hub, and an inner surface. A first pair of male prongs project from the inner surfaces at both ends of the main block. A bridge member is provided on the inner surface of the main block. A clamp block has a second pair of male prongs projecting from the bridge member. The reel hub has a recess in its outer circumferential surface designed to receive the clamp block and female cavities for interacting with the first and second pairs of male prongs of the clamp block, wherein the clamp block is set by pressure in the recess of the reel hub by either the snap mounting method or the friction fit mounting method.

In a preferred embodiment of the invention, the first and second prongs have a hook shape.

The clamp block is molded from a plastic material having certain resilient capacities.

The female cavity comprises a pair of first female cavities for interaction with the first pair of male prongs formed in the inner surface of the recess and a pair of second female cavities for interaction with the second pair of male prongs formed in the bottom of said recess.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

Figure 1:
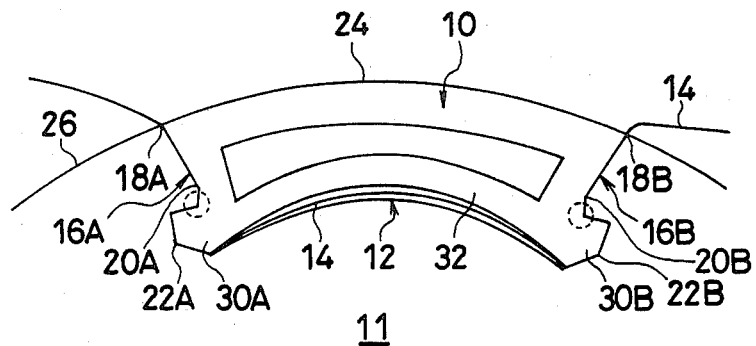
FIG. 1 is a front view of the reel hub of a conventional tape cassette, showing the reel hub parts near the tape clamp.

FIG. 1 is a front view showing the mechanism of the tape clamp mechanism of the reel hub of a conventional tape cassette, wherein a clamp block 10 is set by pressure in a recess 12 provided in the outer circumferential surface of a reel hub body 11. A leader tape 14 is clamped between the recess 12 and the clamp block 10.

Inner surfaces 16A and 16B are located opposite each other on the left and right, respectively, of the recess 12 of the reel hub body 11. The inner surface 16 is almost equally divided into three sections, which are the section for the opening, the section for the intermediate part and the section for the innermost part. As shown in FIG. 1, the intermediate parts 20A and 20B are formed so that their widths are narrower than those of openings 18A and 18B, and the widths of the innermost parts 22A and 22B are also made larger than those of said intermediate parts. The outer surface 24 of the clamp block has a curvature which is almost equal to that of the outer circumferential surface 26 of the reel hub body 11. A pair of prongs 30A and 30B project from both sides of the clamp block 10, and both said prongs project outward. An arched bridge-like part 32 connects the prongs 30A and 30B. The curvature of the arched bridge-like part 32 is larger than that of the outer surface 24 of the clamp block 10.

In order to clamp the leader tape 14 between the clamp block 10 and the recess 12, by setting said clamp block under pressure in said recess of the reel hub body 11, it is necessary to set the prongs 30A and 30B in said recess together with said leader tape by utilizing the elastic deformation of the parts near said prongs. In this case, the deformation of the arched bridge-like part 32 is greater than that of the clamp block 10, since the curvature of said part is larger than that of said block. However, the force acting on each of the prongs 30A and 30B needs to be made large enough to cope with the effect of the presence of the arched bridge-like part 32. As a result, the adverse effect of the deformation extends near the center of the outer surface 24 of the clamp block 10, and the effect of the deformation remains even after said clamp block is set in the recess 12 of the reel hub body 11. Consequently, the irregularity in taking up the tape around the reel tends to occur near the tape clamp unit, and this is one of the important technical problems to be solved.

Besides, in the case of the mechanism used for the conventional tape clamp, as illustrated in FIG. 1, the leader tape 14 is only partially fixed near the parts, indicated by two dotted circles, of the prongs 30A and 30B, so that the clamping force cannot be increased any further.

Figure 2:
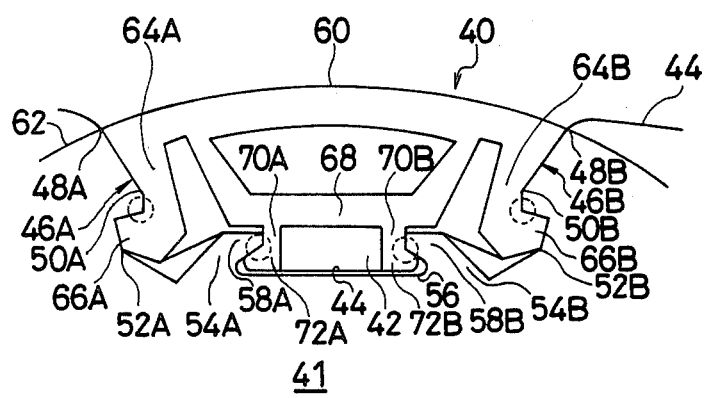
FIG. 2 is a front view of the essential parts of an embodiment of the tape clamp mechanism of the present invention, showing the part near the tape clamp.

In accordance with the invention, as illustrated in the embodiment of FIGS. 2-5, two pairs of hook-shaped male prongs 64A, 64B, 70A and 70B project from the clamp block 40, and female cavities 80A, 80B, 81A and 81B (FIG. 3), which are designed to be locked with the hook-shaped parts 66A, 66B, 72A and 72B (FIG. 4), respectively, are formed in the recess 42 of the reel hub body 41 so that the tape 44 (FIG. 5) (information material) can be securely fixed at the four places indicated by dotted circles in FIG. 2. In this embodiment, both the reel hub body 41 and the clamp block 40 are molded from plastic material having certain resilient capacities.

Figure 3:
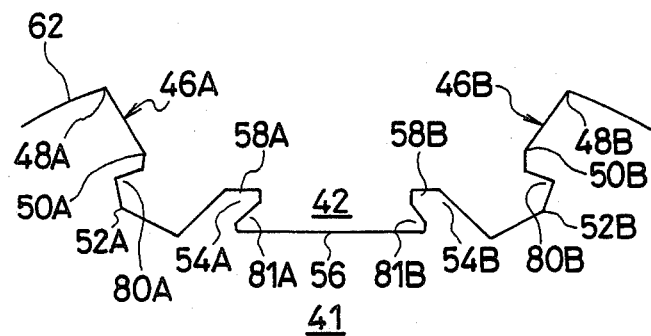
FIG. 3 is a front view of the recess of the reel hub body of FIG. 2.

As shown in FIG. 3, the recess 42 of the reel hub body 41 is molded symmetrically. The distance between the inner surfaces 46A and 46B which are opposite each other is set such that the distance between the intermediate parts 50A and 50B is made smaller than that between the ends 48A and 48B of the opening. The distance between the innermost parts 52A and 52B is made greater than that between the intermediate parts 50A and 50B, and the bottom 56 is provided with two hook-shaped projections 54A and 54B in order to form the female cavities 81A and 81B.

Figure 4:
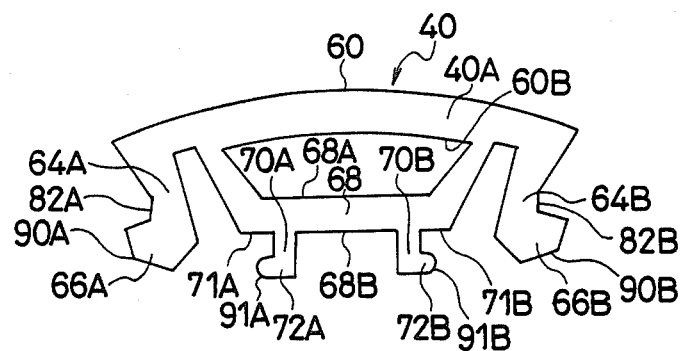
FIG. 4 is a front view of the clamp block of FIG. 2.
Figure 5:
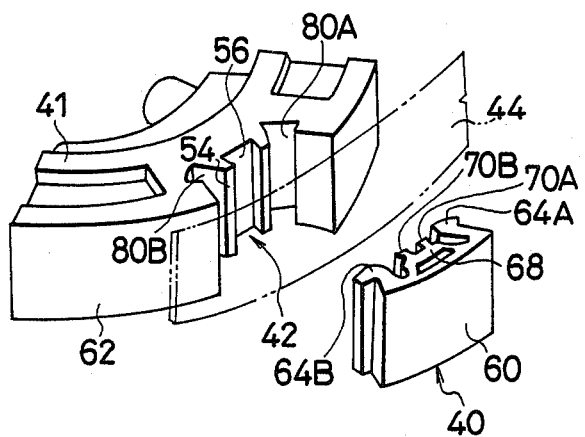
FIG. 5 is an exploded perspective view of the clamp block of FIG. 2.

On the other hand, the clamp block 40 is also molded symmetrically. As illustrated in FIG. 4, the clamp block 40 includes the main block 40A whose curvature is almost equal to that of the outer circumferential surface 62 of the reel hub body 41, and the first pair of hook-shaped male prongs 64A and 64B, having outer surfaces 82A and 82B to fit the inner surfaces 46A and 46B of the recess 42 of the reel hub body 41, project from both of the inner surfaces of said main block. A bridge 68 is provided between the prongs 64A and 64B on the side of the back surface 60B corresponding to the outer surface 60 of the main block 40A, and a hollow space is formed at the inner surface 68A. The second pair of hook-shaped male prongs 70A and 70B project from the outer surfaces 68B, 71A and 71B of the bridge 68, so that said second pair of hook-shaped male prongs can be locked with the female cavities 81A and 81B formed by the two hook-shaped projections 54A and 54B on the bottom 56 of the recess 42 of the reel hub body 41. The second pair of male prongs 70A and 70B are shaped so as to be able to fit the female cavities 81A and 81B.

In FIG. 3, hook-shaped parts 58A and 58B of the projections 54A and 54B form the female cavities 81A and 81B to fit the second pair of prongs 70A and 70B In FIG. 4, the hook-shaped parts 66A, 66B, 72A and 72B are at the ends of the first and the second pairs of the male prongs 64A, 64B, 70A and 70B, respectively.

The process for securing the leader tape 44 in the recess 42 of the reel hub body 41, using the clamp block 40, is now explained.

First, the leader tape 44 is held by the ends of the hook-shaped parts 66A, 66B, 72A and 72B of the clamp block 40. Then, the prongs such as 64A, 70A, 70B and 64B are fit in the recess 42 of the reel hub body 41, one by one, from one side to the other in the order in which said prongs are arranged. In this case, the first and second pairs of hook-shaped prongs 64A, 64B and 70A, 70B projecting from the clamp block 40, respectively, can readily be deformed elastically at the part near the root, since said clamp block is molded from plastic material. Thus, each of the prongs 64A, 64B, 70A and 70B can easily be fit in the recess 42 of the reel hub body 41 by way of the outer surfaces 90A, 90B, 91A and 91B of the hook-shaped parts 66A, 66B, 72A and 72B, respectively, since said outer surfaces serve as guide surfaces.

After fitting, the hook-shaped parts 66A, 66B, 72A and 72B at the ends of the prongs 64A, 64B, 70A and 70B return to their original states, so that they are locked adequately within the female cavities 80A, 80B, 81A and 81B, respectively, formed in the inner surfaces 46A and 46B of the recess 42, and held securely. In this embodiment, the clamp block 40 requires relatively small pressure in order to be fit, so that the effect of the deformation will not extend to the center of the outer surface 60 of said clamp block, and is limited to the areas near the roots of the hook-shaped prongs 64A, 64B, 70A and 70B. In this way, the leader tape 44 is set and secured in the recess 42 of the reel hub body 41, and the tape is secured more tightly at the four local clamping parts formed by the arched inner surfaces of the hook-shaped parts 66A, 66B, 72A and 72B, as indicated by the dotted lines in FIG. 2.

Whenever necessary, however, the leader tape 44 can be clamped and fixed at two or three points instead of the four points. Furthermore, when the space, which is almost equal to the thickness of the leader tape 44, is provided between the outer surfaces 71A and 71B of the bridge 68 of the clamp block 40 and the end surfaces of the hook-shaped parts 58A and 58B of the hook-shaped projections 54A and 54B provided at the bottom of the recess 42 of the reel hub body 41 (FIG. 2), the outer surface 60 of said clamp block can be prevented from protruding from the outer circumferential surface 62 of said reel hub body due to the thickness of said leader tape.

The tape clamp mechanism of the invention, the details of which are hereinbefore explained, enables the clamp piece, or clamp block, to be set more easily in the recess of the reel hub body, provides greater clamping strength, frees the outer surface from the adverse effect of deformation at the time of clamping, and eliminates the irregularity occurring near the tape clamp in taking up the tape.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A tape clamp mechanism for a reel hub of a tape cassette, said reel hub having a circumferential curved surface, said tape clamp mechanism comprising
   a clamp block for clamping a tape to the reel hub, said clamp block having a main block having spaced opposite ends, an outer curved surface corresponding to the outer circumferential curved surface of
the reel hub and an inner surface;
a first pair of prongs projecting from the inner surface
at both ends of said clamp block;
a bridge member provided on the inner surface of said
main block; and
a second pair of prongs projecting from said bridge
member;
said reel hub having a recess for receiving said clamp
block and said recess having cavity means for interacting with said first and second pairs of prongs of
said clamp block, wherein said clamp block is settable in said recess of said reel hub by a snap mounting or friction fit method;
wherein said cavity means comprise
a first pair of cavities for receiving said first pair of
prongs,
a second pair of cavities for receiving said second pair
of prongs;
and said hub comprises
a pair of projections, each projection situated between respective ones of said first and second pairs
of cavities.

2. A tape clamp mechanism as claimed in claim 1, wherein said first pair of prongs are hook-shaped.

3. A tape clamp mechanism as claimed in claim 2, wherein said second pair of prongs are hook-shaped.

4. A clamp mechanism as claimed in claim 3, wherein said circumferential curved surface of said reel hub has a curvature substantially equal to that of said outer curved surface of said main block, and said circumferential curved surface of said reel hub is substantially on the same curved surface as that of said outer curved surface of said main block.

5. A tape clamp mechanism as claimed in claim 3, wherein said cavity means have surfaces which fit outer surfaces of said first and the second pairs of said prongs.

6. A tape clamp mechanism as claimed in claim 5, wherein said clamp block is molded from plastic material having resilient capacities.

7. The mechanism of claim 1, wherein said bridge member projects inwardly from said main block and is connected at two locations thereto, said locations separate and apart from locations where said first pair of prongs are connected to said main block,
with a recess being formed between said bridge member and a respective one of said first pair of prongs.

8. The mechanism of claim 7, wherein a hollow space is formed between an inner surface of said bridge member and the inner surface of said main block.

9. The mechanism of claim 1, wherein said clamp block constitutes means for fixing a tape to said reel hub at four separate, distinct locations, each location being between a respective prong and said hub.

10. The mechanism of claim 1, wherein all said prongs and said projections are hooked-shaped; and
said hub additionally comprises
intermediate edges situated between said cavity means and said circumferential curved surface of said reel hub, said intermediate edges positioned closer to one another than edges of said recess at said circumferential curved surface and formed to mate with said first pair of hook-shaped prongs;
with said block and hub shaped to clamp a tape at four distinct, separate locations therebetween, two of said locations being between said intermediate edges of said hub and crotches of said first pair of hook-shaped prongs; and
two of said locations being between said hook-shaped projections of said hub and crotches of said second pair of hook-shaped prongs.

11. The mechanism of claim 1, wherein said second pair of prongs project from an outer surface of said bridge member in a direction away from said main block.

12. The mechanism of claim 1, wherein said first and second pair of prongs project in substantially the same direction.

13. A tape clamp mechanism
for a reel hub of a tape cassette, said reel hub having a circumferential curved surface, said tape clamp mechanism comprising
a clamp block for clamping a tape to the reel hub, said clamp block having a main block having spaced opposite ends and an outer curved surface corresponding to the outer circumferential curved surface of the reel hub and an inner surface;
a first pair of prongs projecting from the inner surface at both ends of said main block;
a bridge member provided on the inner surface of said main block and connected thereto separate and apart from the connection of said first pair of prongs thereto; and
a second pair of prongs projecting from said bridge member;
said reel hub having a recess for receiving said clamp block and said recess having cavity means for interacting with said first and second pairs of prongs of said clamp block;
wherein said clamp block is settable in said recess of said reel hub by a snap mounting or friction fit mounting method;
wherein said cavity means comprise
a first pair of cavities for receiving said first pair of prongs;
a second pair of cavities for receiving said second pair of prongs;
and said hub comprises
a pair of projections, each projection situated between respective ones of said first and second pairs of cavities.

14. The mechanism of claim 13, wherein said hub additionally comprises
two intermediate edges situated between said cavity means and said circumferential curved surface thereof,
said intermediate edges positioned closer to one another than edges of said recess at said circumferential curved surface.

* * * * *